(12) United States Patent
Larson et al.

(10) Patent No.: US 7,464,727 B1
(45) Date of Patent: Dec. 16, 2008

(54) CLEAN-OUT REPAIR PLUG

(75) Inventors: Richard E. Larson, Victoria, MN (US); Steven S. Peterson, Memphis, TN (US)

(73) Assignee: IPS Corporation, Collierville, TN (US)

( * ) Notice: Subject to any disclaimer, the term of this patent is extended or adjusted under 35 U.S.C. 154(b) by 0 days.

(21) Appl. No.: 11/876,256

(22) Filed: Oct. 22, 2007

(51) Int. Cl.
*F16L 55/10* (2006.01)

(52) U.S. Cl. .......................... 138/89; 138/92

(58) Field of Classification Search ............... 138/89, 138/92
See application file for complete search history.

(56) References Cited

U.S. PATENT DOCUMENTS

| | | | | |
|---|---|---|---|---|
| 3,291,156 | A * | 12/1966 | Corsano | 138/89 |
| 3,494,504 | A * | 2/1970 | Jackson | 220/237 |
| 3,613,936 | A * | 10/1971 | Kaiser et al. | 220/237 |
| 3,667,640 | A | 6/1972 | Morrow | 220/235 |
| 4,303,101 | A * | 12/1981 | Tholen | 138/89 |
| 4,312,708 | A * | 1/1982 | Leslie | 376/203 |
| 4,493,344 | A * | 1/1985 | Mathison et al. | 138/89 |
| 4,585,033 | A | 4/1986 | Westman | 138/89 |
| 4,820,474 | A * | 4/1989 | Leslie et al. | 376/203 |
| 5,035,266 | A * | 7/1991 | Benson et al. | 138/92 |
| 5,348,085 | A | 9/1994 | Benson | 166/92.1 |
| 5,353,841 | A | 10/1994 | Mathison et al. | 138/93 |
| 6,513,549 | B2 * | 2/2003 | Chen | 138/89 |

* cited by examiner

*Primary Examiner*—Patrick F Brinson
(74) *Attorney, Agent, or Firm*—Alston & Bird LLP (57) ABSTRACT

The present invention addresses provides a clean-out plug that seals a pipe system clean-out that includes a clean-out end and an inner surface, a portion of which is threaded. In general, the clean-out plug includes a compressible sealing member that is retained by the clean-out plug and that seals against an inner surface of the clean-out and/or the back side of the threaded portion of the clean-out. The clean-out plug may also include a cover plate that is secured to the clean-out plug via a second retaining member that engages a first retaining member of the clean-out plug. By sealing against the inner surface and/or back side of the threaded portion of the clean-out, various embodiments of the present invention do not seal within the treaded portion of the clean-out, which is often damaged by cross-threading from previous removals and reinsertions of threaded clean-out plugs. Additionally, by retaining the sealing member, the sealing member remains with the clean-out plug when the clean-out plug is removed from the clean-out.

12 Claims, 7 Drawing Sheets

CLEAN-OUT REPAIR PLUG

FIELD OF THE INVENTION

The present invention relates to plug devices for use in pipe systems, and more particularly to devices used to seal access openings in pipe systems.

BACKGROUND OF THE INVENTION

Pipe or plumbing systems often include access openings or ports that allow the interior of the pipes of the pipe system to be inspected and/or cleaned. Access opening configurations for such pipe systems can vary in size and shape, although many configurations are standardized. In one common configuration, an access opening is provided at the end of a relatively short section (often referred to as a "clean-out") of cylindrical pipe that extends away from the axis of the main pipe section. Clean-outs may extend from a main pipe section at any angle. Those that extend approximately 90 degrees from the main pipe section are commonly called "clean-out tees" (referring to the T-shape created by the intersecting pipe sections).

Many clean-outs have a standard configuration in which the inner surface of the end of the clean-out is threaded adjacent the access opening so as to receive a correspondingly threaded clean-out end cap or plug that closes off the access opening. This plug is intended to be removed and reinstalled as necessary for access to the interior of the pipe system. In many pipe systems, the constant removal and reinstallation of a clean-out plug damages portions of the threads of the corresponding clean-out. Such damage may include cross-threading, which is the result of the two mating threads attempting to engage each other when out of alignment. Cross-threading occurs when the external threads of the clean-out plug tend to cross over the crests of the internal threads of the clean-out. This can produce deformation of the clean-out threads, primarily at the leading and middle portions of the threaded area.

Thread damage is also a problem if the clean-out plug is not removed very often, and the clean-out plug and/or the clean-out becomes corroded or otherwise seized together. The removal process may then involve destructive removal steps, which may lead to significant damage to the internal threads of the clean-out. However damaged, it may be difficult or impossible to reinstall a conventional clean-out plug to appropriately close off the pipe system.

In the past, various types of replacement clean-out plugs have been proposed for use with pipe system clean-outs. For example, U.S. Pat. No. 5,035,266 ("the '266 patent") describes a replacement mechanical plug device for sealing pipe system access openings having threaded inner surfaces. The plug device described by the '266 patent includes a radially expandable O-ring structure that has an outer circumference configured to seal a pipe system clean-out. However, this device suffers from several shortcomings. Most notably, the O-ring structure described by the '266 patent includes an external surface configured, when expanded, to mate within the threaded portion of the clean-out. As noted above, the threaded portion of the clean-out is often damaged by removal and reinstallation of the original clean-out plug. As a result, the replacement mechanical plug described by the '266 patent will not provide optimal sealing of a threaded clean-out where the treads have been damaged, such as by cross-threading. Additionally, the O-ring structure of the '266 patent is not attached to the plug device, and after extended usage the expanded O-ring structure tends to adhere to the interior of the clean-out such that when the clean-out plug is removed, the plug pulls through the O-ring and the O-ring remains attached to the inside of the clean-out.

There is a need, therefore, for an improved clean-out plug that is configured to seal the access opening of a threaded pipe system clean-out. The clean-out plug should be configured to seal the access opening despite damage to the clean-out threads. The clean-out plug should also provide improved sealing around the internal periphery of the clean-out, and should be capable of being removed without damaging the plug.

BRIEF SUMMARY OF THE INVENTION

The present invention addresses the above needs and achieves other advantages by providing a clean-out plug that seals a pipe system clean-out that includes a clean-out end and an inner surface, a portion of which is threaded. In general, the clean-out plug includes a compressible sealing member that seals against an inner surface of the clean-out and/or the back side of the threaded portion of the clean-out, and that is retained by the clean-out plug. By sealing against the inner surface and/or back side of the threaded portion of the clean-out, various embodiments of the present invention do not rely on a seal against the threaded portion of the clean-out, which is often damaged by cross-threading from previous removals and reinsertions of threaded clean-out plugs. Additionally, by retaining the sealing member, the sealing member remains with the clean-out plug when the clean-out plug is removed from the clean-out.

In one embodiment, the clean-out plug comprises a first plate configured to allow a portion of a threaded retaining member to pass therethrough and comprising a flange, the flange defining an outer end surface and a radially disposed inner contact surface, the inner contact surface configured to abut the clean-out end; and a core extending from the flange and configured to fit inside the clean-out, the core further defining a radially disposed retaining recess. The clean-out plug also includes a compressible ring-shaped sealing member configured to be retained by the retaining recess and defining a peripheral sealing surface and an angled contact surface extending inward from the peripheral sealing surface. A second plate, opposing the first plate, defines an end surface and a radially disposed angled contact surface extending inward from the end surface. The second plate is configured to receive a threaded portion of the retaining member such that when the retaining member engages the second plate, the first and second plates are drawn together. The angled contact surfaces of the second plate and the ring-shaped sealing member are configured such that upon drawing the first and second plates together, the ring-shaped sealing member compresses between the first and second plates and extends outwardly to seal against the inner surface of the clean-out behind its threaded portion.

In other embodiments, the retaining recess of the first plate may define a groove configured to retain a ring located on the sealing member. The sealing member may be constructed of an elastomeric material and may be further configured to seal against a back side of an end thread of the threaded portion of the clean-out. The first plate may be further configured to receive an end of the retaining member, and the outer end surface may be substantially planar. The outer end surface of the second plate may also be substantially planar. The second plate may receive the threaded portion of the retaining member in a threaded bore, which may not extend through the end surface of the second plate. The core of the first plate may further comprise a substantially cylindrical cavity and the second plate may further comprise a substantially cylindrical neck extending from the angled contact surface, such that the cavity of the first plate receives the neck of the second plate.

Some embodiments may further comprise a second retaining member and a cover plate configured to allow a portion of the second retaining member to pass therethrough, wherein the first retaining member may be configured to receive a portion of the second retaining member such that when the second retaining member engages the first retaining member, the cover plate covers the first plate. In some embodiments the first retaining member may receive the second retaining member in a threaded bore disposed approximately in the center of the first retaining member.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

Figure 1:
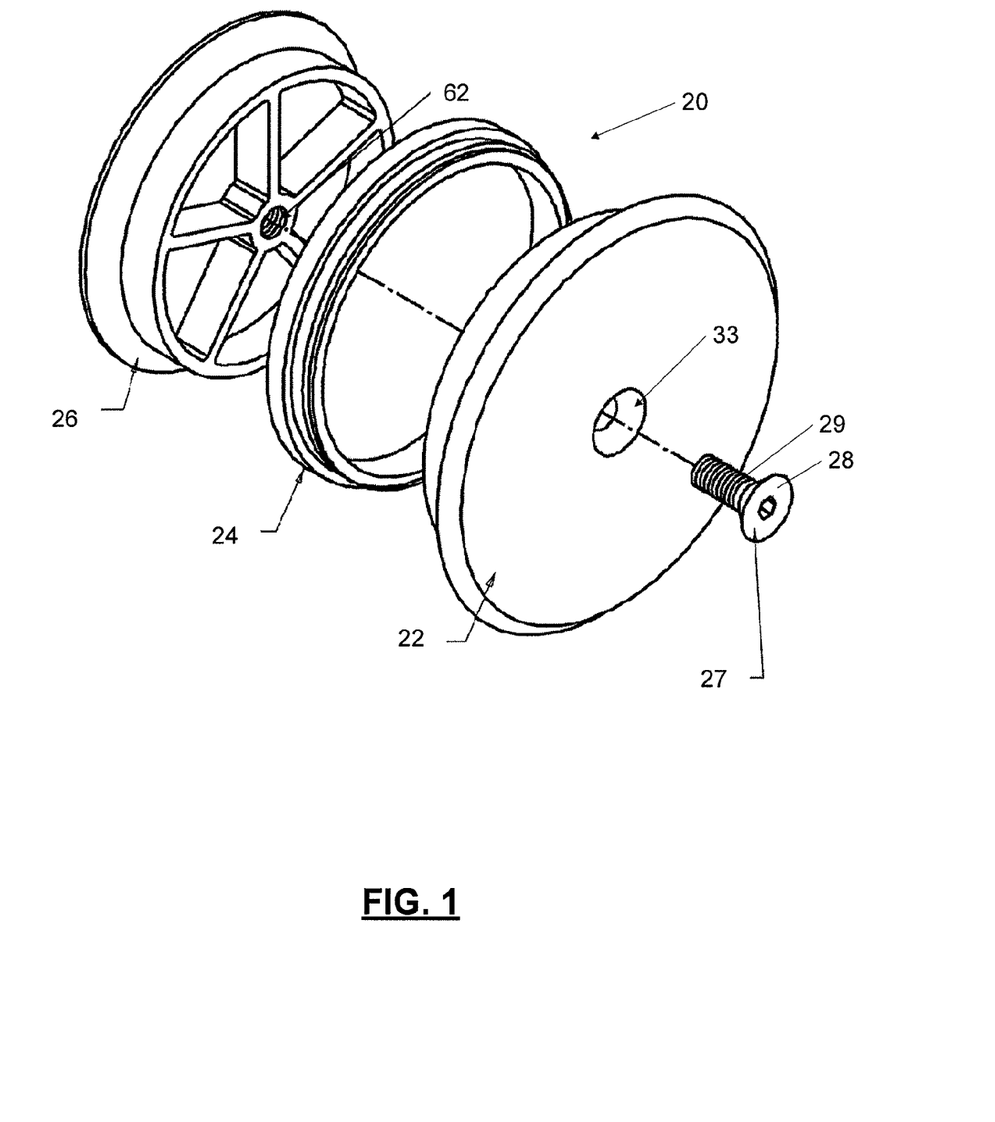
FIG. 1 is a perspective exploded view of a clean-out plug in accordance with one embodiment of the invention.

A clean-out plug 20 in accordance with one embodiment of the present invention is shown in FIG. 1. In general, the clean-out plug 20 of the depicted embodiment comprises a first plate 22, a second plate 26, and a compressible ring-shaped sealing member 24, sandwiched between the first and second plates, 22, 26. A threaded portion 29 of a retaining member 27 passes through the first plate 22 such that a countersunk head 28 is received by a countersink 33 in the first plate and the threaded portion 29 is received by a threaded bore 62 in the second plate 26.

Figure 2:
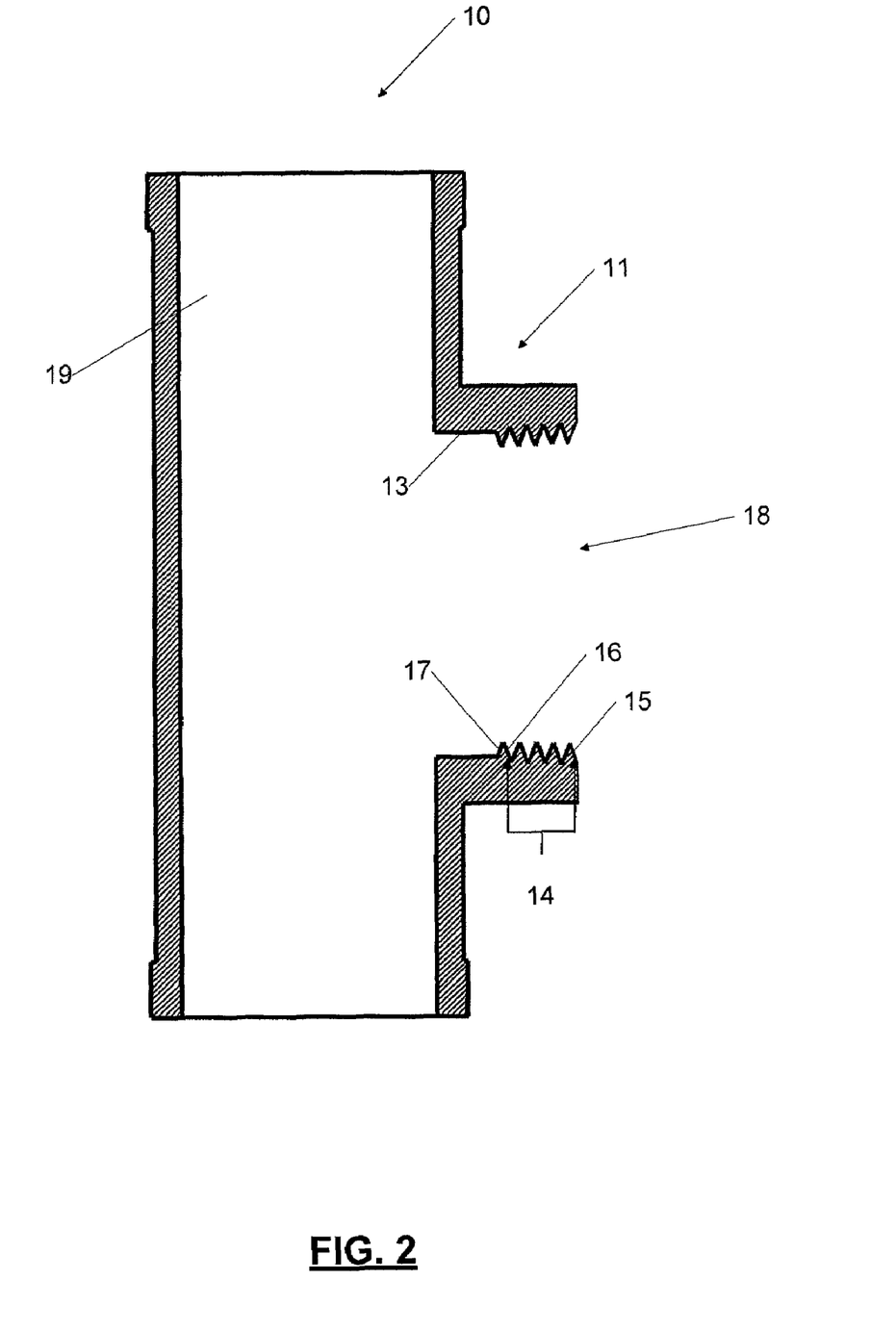
FIG. 2 is a cross-section view of a portion of a pipe system showing a clean-out having a partially threaded inner surface.

As noted above, the clean-out plug 20 of the depicted embodiment may be used to seal pipe-system clean-outs of a variety of configurations. One such configuration is shown in FIG. 2. The clean-out 11 depicted in FIG. 2 extends approximately 90 degrees from a main pipe section 19 of a pipe system 10. The depicted clean-out 11 includes a substantially circular clean-out end 12 that defines an access opening 18. The clean-out 11 also includes a cylindrical inner surface 13 that includes an internally located threaded portion 14 proximate the clean-out end 12. The threaded portion 14 is defined by a lead thread 15, which is located adjacent the clean-out end 12, and an end thread 16, which is located at the other end of the threaded portion 14. In many instances, the length of the threaded portion 14, and thus the position of the end thread 16, is standardized in order to accept clean-out plugs provided by a variety of manufacturers.

Figure 3:
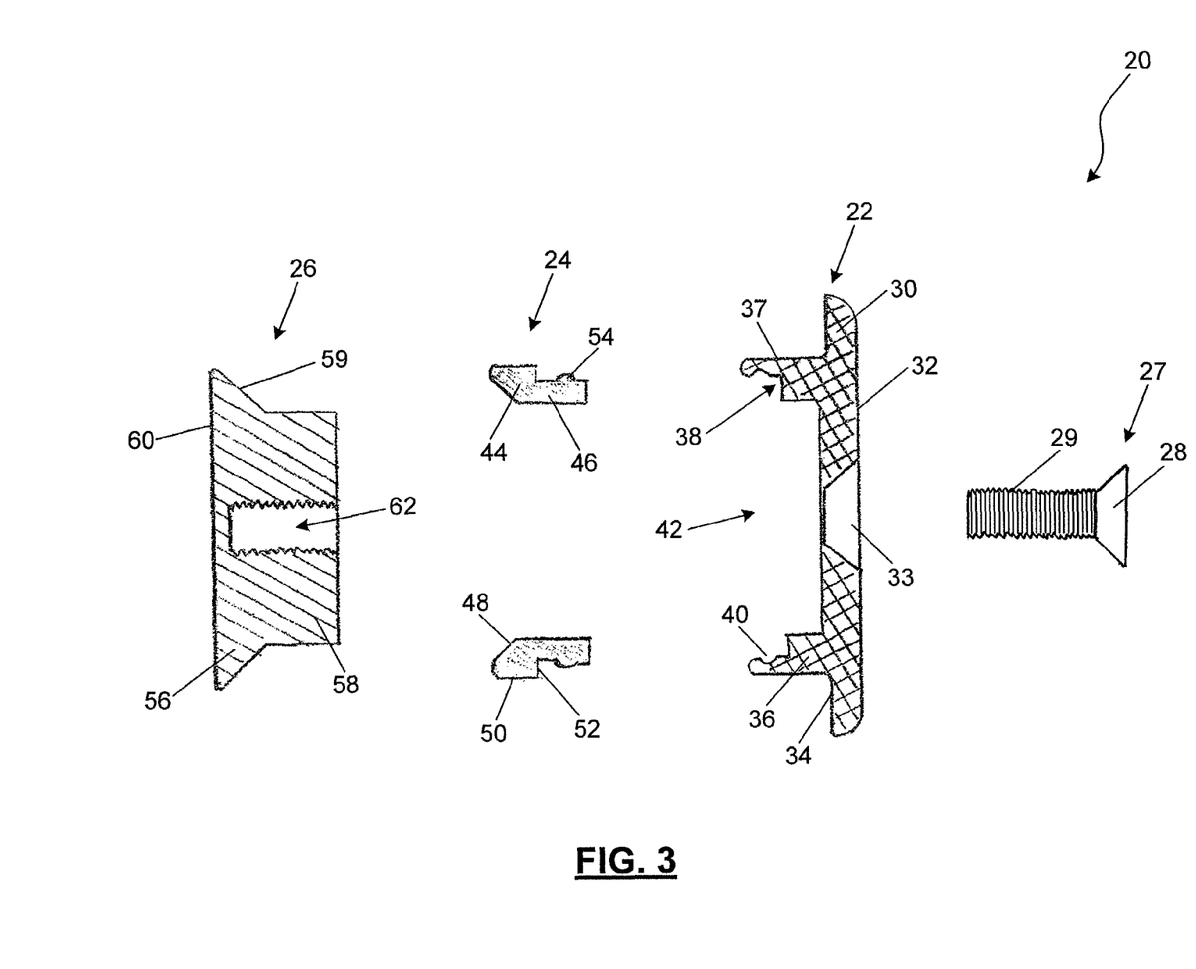
FIG. 3 is an exploded cross-section view of a clean-out plug in accordance with one embodiment of the invention.

FIG. 3 shows an exploded cross-section view of the clean-out 20 depicted in FIG. 1. As noted above, the clean-out 20 generally comprises first and second plates 22, 26, and a compressible ring-shaped sealing member 24, held together by a retaining member 27. In the depicted embodiment, the first and second plates 22, 26 are constructed of a plastic material, specifically Acrylonitrile Butadiene Styrene (ABS), however in other embodiments either one, or both of the plates 22, 26 may be constructed of any other suitable material including, but not limited to, metal and/or plastic materials. In the depicted embodiment, the sealing member 24 is constructed of neoprene, however in other embodiments the sealing member 24 may be constructed of any another suitable material, including, but not limited to, other elastomeric materials. As shown in the figure, the first plate 22 of the depicted embodiment includes a flange portion 30 and a core portion 36 that extends approximately perpendicularly from the flange portion 30. In the depicted embodiment, the flange portion 30 defines a ring-shaped inner contact surface 34 and an outer end surface 32. The outer end surface 32 is substantially planar except for a countersink 33 located approximately in its center. Although in various other embodiments, retaining members of different configurations may be used, in the depicted embodiment, the countersink 33 is configured to allow the head 28 of the countersunk retaining member 27 to fit within the countersink 33 such that head 28 fits substantially flush with the outer end surface 32. In other embodiments, the outer end surface 32 may have various configurations, including, but not limited to, configurations in which the outer end surface is non-planar and configurations in which one or more retaining members extend outward from the outer end surface.

The core portion 36 of the first plate 22 defines an outer periphery surface 37, a ring-shaped retaining recess 38, and a main cavity 42 defined as a cylindrical cutout area located approximately in the center of the core portion 36. As will be discussed in more detail below, the retaining recess area 38 is further defined by a retaining groove 40 defined along an inner periphery of the core portion 36.

As also shown in the figure, the sealing member 24 of the depicted embodiment generally comprises an outer ring portion 44 and an inner ring portion 46. The outer ring portion 44 includes a first sealing surface 50, an angled contact surface 48, and a second sealing surface 52. The first sealing surface 50 is defined around an outer periphery of the outer ring portion 44. The angled contact surface 48 extends at an approximate 45 degree angle from one end of the first sealing surface 50 and the second sealing surface 52 extends approximately perpendicularly inward from the other end of the first sealing surface 50. The inner ring portion 46 of the sealing member 24 extends perpendicularly outward from the outer ring portion 44, and includes a retaining bump 54, which extends around the periphery of the inner ring portion 46.

As further shown in the figure, the second plate 26 of the depicted embodiment of the present invention generally includes an end portion 56 and an inner neck portion 58. The end portion 56 defines an end surface 60, which, in the depicted embodiment, is substantially planar. In other embodiments, the end surface may be non-planar. The end portion 56 also defines an angled contact surface 59, which extends inward at an approximate 45 degree angle from an outer periphery of the end surface 60. The inner neck portion 58 extends perpendicularly from the end portion 56 and is substantially cylindrical. A threaded bore 62 is located approximately in the center of the second plate 26. Although in other embodiments, the threaded bore 62 may extend through the second plate, in the depicted embodiment, the threaded bore 62 extends into a portion of the second plate 26, but does not extend through the end surface 60.

To assemble, the inner ring portion 46 of the sealing member 24 is placed inside the retaining recess 38 of the core portion 36 of the first plate 22 such that the retaining bump 54 of the sealing member 24 is received inside the retaining groove of the first plate 22, thus removably attaching the sealing member 24 to the first plate 22. The inner portion 58 of the second plate is then inserted into the opening of the sealing member 24. The threaded portion 29 of the retaining member 27 is received by the threaded bore 62. The inner portion 58 of the second plate 56 is configured to fit within the main cavity 42 of the first plate 22, however in other embodiments the first and second plates 22, 26 may have different configurations and need not include these features as long as the plates 22, 26 may be drawn together in order to compress and extend the sealing member 24.

Figure 4:
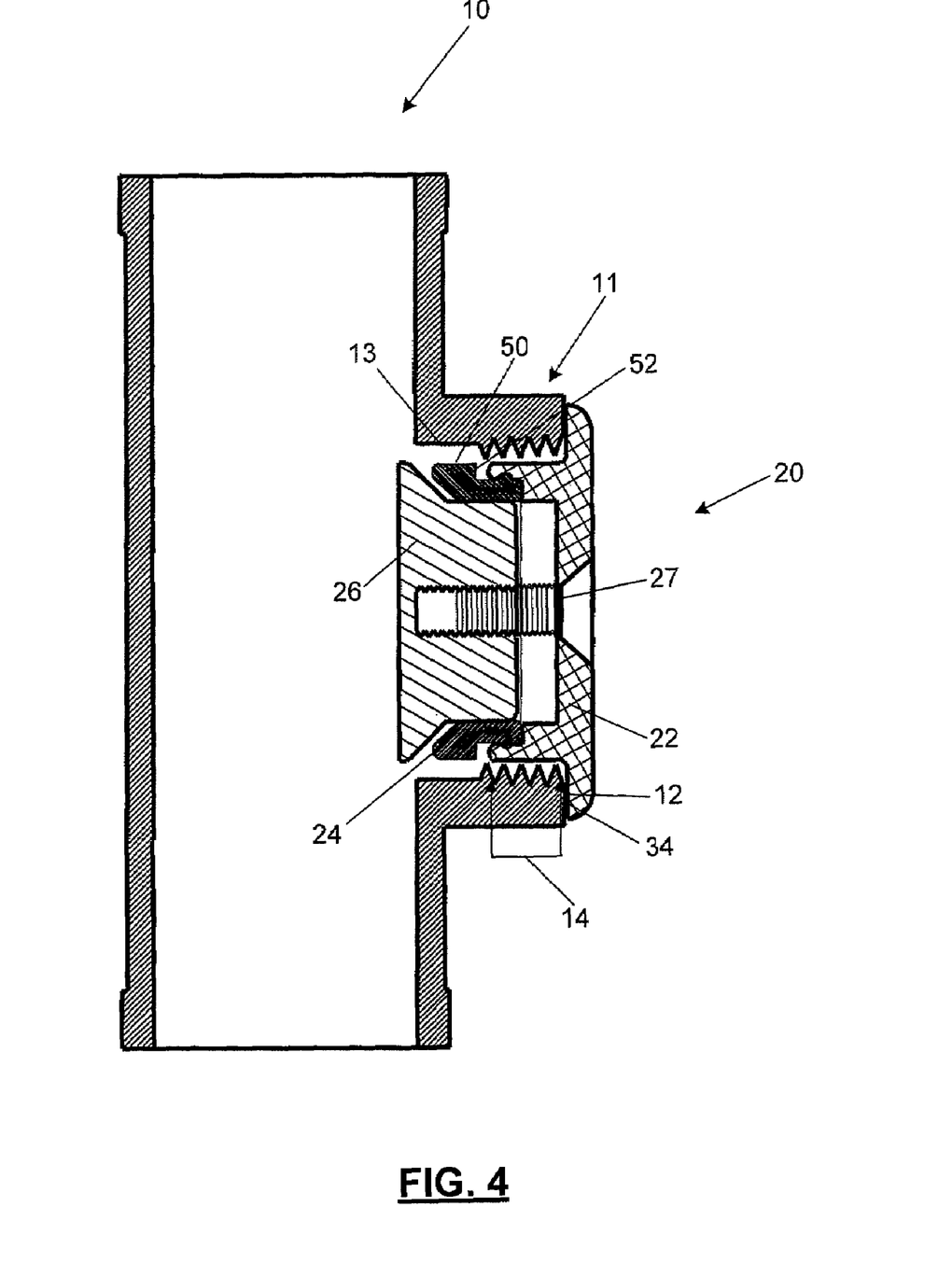
FIG. 4 is a cross-section view of the clean-out of FIG. 2 with a clean-out plug in accordance with one embodiment of the invention installed against the clean-out end to cover the access opening.

FIG. 4 shows the clean-out plug 20 in an assembled, but not fully engaged condition, such that the plug 20 may be inserted into the access opening 18 of the clean-out 11. As shown in the figure, the inner contact surface 34 of the first plate 22 contacts the clean-out end 12. The dimensions of the first and second plates 22, 26 and the sealing member 24 are such that when assembled but not fully engaged, the clean-out plug 20 fits within the clean-out 11, such that the first sealing surface 50 of the sealing member 24 creates a seal beyond the threaded portion 14 of the clean-out 11.

Figure 5:
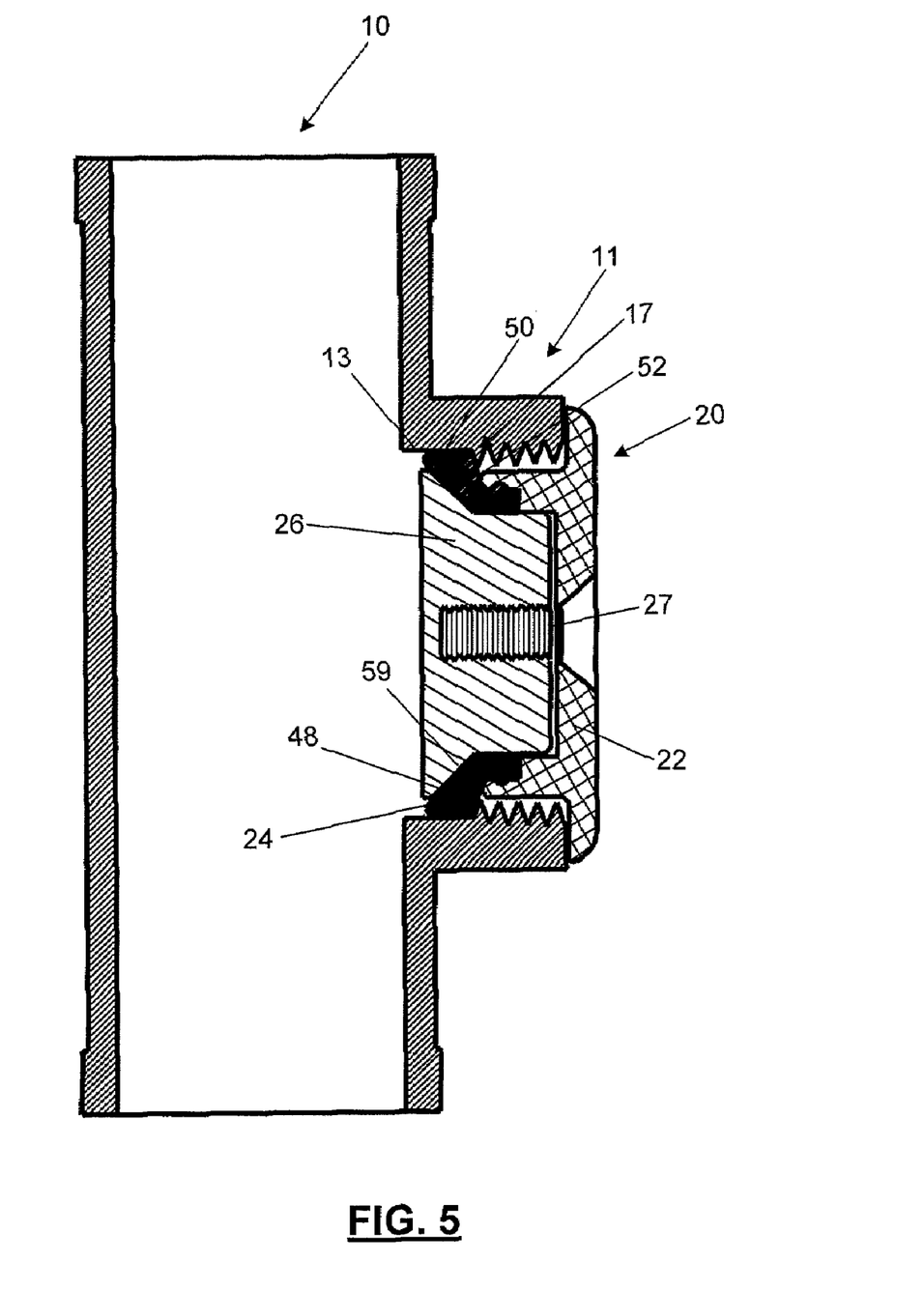
FIG. 5 is a cross-section view of the clean-out of FIG. 2 with first and second plates of a clean-out plug drawn together in accordance with one embodiment of the invention for sealing the access opening.

Referring to FIG. 5, upon tightening the retaining member 27, the first and second plates 22, 26 are drawn together. As the plates 22, 26 draw together, the angled contact surface 59 of the second plate 26 contacts the angled contact surface 48 of the sealing member 24 so that the angled contact surface 48 of the sealing member 24 slides along the angled contact surface 59 of the second plate 26 and the sealing member 24 compresses between the first and second plates 22, 26 and expands outward as shown in the figure. As the sealing member 24 expands outward, the sealing member 24 seals around an unthreaded portion of the inner surface 13 of the clean-out 11. Additionally, in the depicted embodiment, the sealing member 24 seals against the back side 17 of the end thread 16 of the threaded portion 14 of clean-out 11. Thus, in the depicted embodiment, the configuration of the first and second plates 22, 26 and the sealing member 24 are such that the first sealing surface 50 seals around an unthreaded portion of the inner surface 13 of the clean-out 11 and the first sealing surface 50 or the second sealing surface 52 seals against the back side 17 of the end thread 16 of the threaded portion 14.

It should be noted that in other embodiments, the configurations of the first and second plates 22, 26 and the sealing member 24 may differ from that shown in the figures and may constitute any configuration that upon compressing the sealing member 24 between the first and second plates 22, 26 results in the expansion of the sealing member 24 so that it seals around an unthreaded portion of the inner surface 13 of the clean-out 11. In additional embodiments, the configurations of the first and second plates 22, 26 and the sealing member 24 may constitute any configuration that upon compressing the sealing member 24 between the first and second plates 22, 26 results in the expansion of the sealing member 24 so that it seals against the back side 17 of the end thread 16 of the threaded portion 14.

As a result of the features discussed above, the present invention, in various embodiments, provides several advantages over the prior art. For example, by sealing against an unthreaded portion of the inner surface 13 of the clean-out 11, embodiments of the present invention do not rely on sealing within the threaded portion 14, which is often damaged by cross-threading from previous removals and reinsertions of threaded clean-out plugs. Additionally, by sealing against the back side 17 of the end thread 16 of the threaded portion 14, embodiments of the present invention securely seal the clean-out such that the clean-out plug 20 cannot be easily removed from the clean-out 11. Additionally, any increase in pressure within the pipe system 10 will tend to draw the second plate 26 toward the first plate 24 further expanding the sealing member 24 and increasing its sealing force against the inner surface 13 and/or the back side 17 of the end thread 16 of the threaded portion 14. Furthermore, by removably attaching the sealing member 24 to the first plate 22, the sealing member 24 of embodiments of the present invention remains part of the clean-out plug 20 so that when the clean-out plug 20 is removed from the clean-out 11, the sealing member 24 comes with it.

Figure 6:
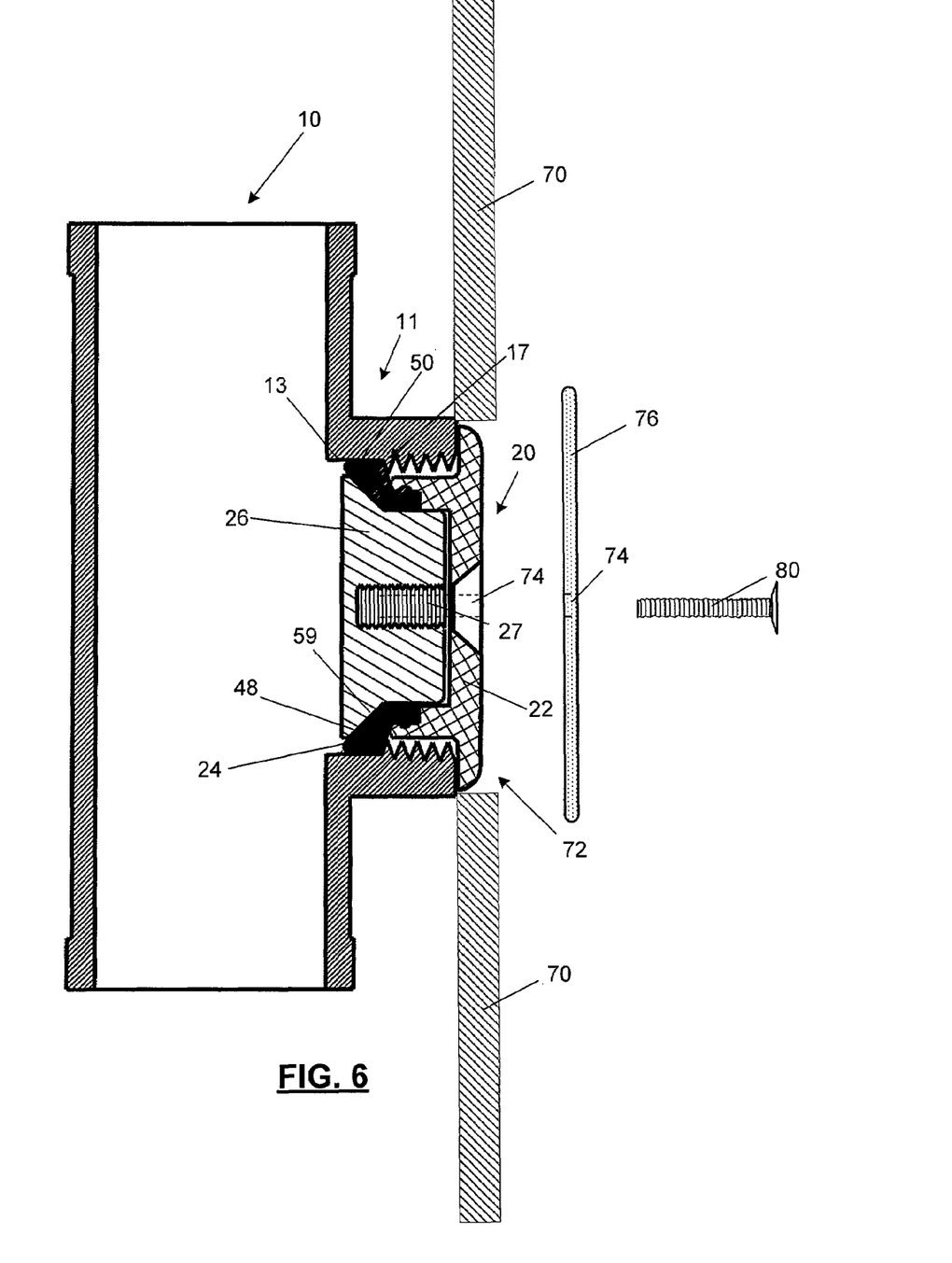
FIG. 6 is a cross-section view of the clean-out and clean-out plug of FIG. 2 including a cover plate and retaining member shown in an exploded view in accordance with one embodiment of the present invention.
Figure 7:
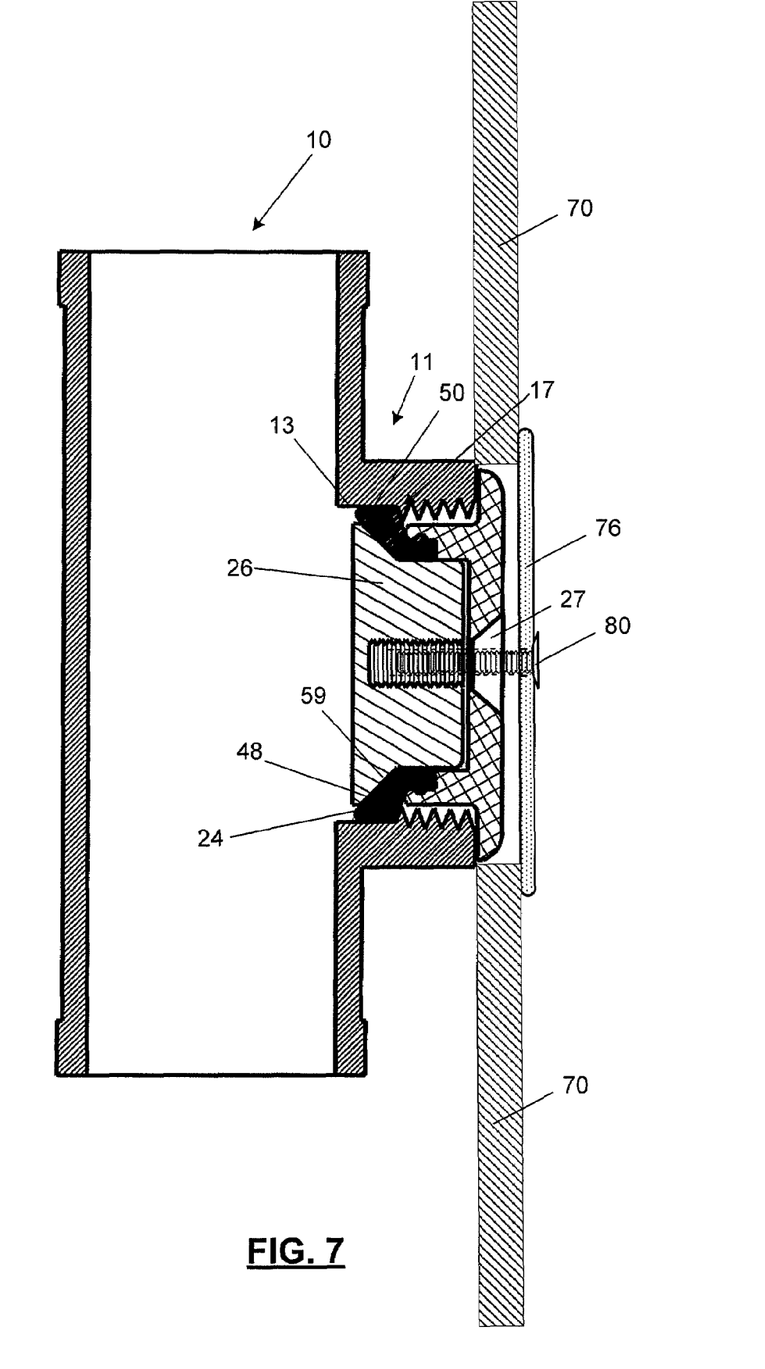
FIG. 7 is a cross-section view of the clean-out and clean-out plug of FIG. 6 with the cover plate secured to and covering the clean-out plug.

In many applications, a pipe system clean-out may be located behind a wall or other intermediate surface. For such applications, it may be desirable to include a clean-out plug cover plate, which may cover up an access hole in the wall and may serve as a decorative cover that can be easily removed to expose the clean-out plug. Referring to the embodiment of the present invention shown in FIG. 6, pipe system 10 of the depicted embodiment is located behind wall 70. An access hole 72 provides access to clean-out 11 and clean-out plug 20. In the depicted embodiment, a center bore of retaining member 27 is threaded to create an internal threaded portion 74. A cover plate 76 having a center hole 78 is configured to fit over the access hole 72 such that the center hole 78 aligns with the internal threaded portion 74 of retaining member 27. The internal threaded portion 74 is configured to receive a second retaining member 76 that passes through center hole 78 of the cover plate 76 such that when the second retaining member 80 is engaged with the internal threaded portion 74, the cover plate 76 can be secured to clean-out plug 20 and against wall 70, as shown in FIG. 7.

Many modifications and other embodiments of the invention set forth herein will come to mind to one skilled in the art to which this invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A clean-out plug for use with a pipe system clean-out, the clean-out defining a clean-out end and having an inner surface, a portion of which is threaded, said clean-out plug comprising:

a first plate configured to allow a portion of a retaining member to pass therethrough and comprising:

a flange, the flange defining an outer end surface and a radially disposed inner contact surface, the inner contact surface configured to abut the clean-out end; and a core extending from the flange and configured to fit inside the clean-out, the core further defining a radially disposed retaining recess;

a compressible ring-shaped sealing member configured to be removably attached to the first plate by the retaining recess and defining a peripheral sealing surface and an angled contact surface extending inward from the peripheral sealing surface; and a second plate, opposing the first plate and defining an end surface and a radially disposed angled contact surface extending inward from the end surface, the second plate configured to receive a portion of the retaining member such that when the retaining member engages the second plate, the first and second plates are drawn together, and wherein the angled contact surfaces of the second plate and the sealing member are configured such that upon drawing the first and second plates together, the sealing member is compressed between the first plate and the second plate and extends outwardly to seal against the inner surface of the clean-out behind is the threaded portion.

2. The clean-out plug according to claim 1, wherein the retaining recess defines a groove configured to retain a ring located on the sealing member.

3. The clean-out plug according to claim 1, wherein the threaded portion defines an end thread, and wherein the sealing member is further configured to seal against a back side of the end thread.

4. The clean-out plug according to claim 1, wherein the first plate is further configured to receive an end of the retaining member.

5. The clean-out plug according to claim 4, wherein the outer end surface of the first plate is substantially planar.

6. The clean-out plug according to claim 1, wherein the end surface of the second plate is substantially planar.

7. The clean-out plug according to claim 1, wherein the second plate receives the threaded portion of the retaining member in a threaded bore.

8. The clean-out plug according to claim 7, wherein the threaded bore does not extend through the end surface of the second plate.

9. The clean-out plug according to claim 1, wherein the core of the first plate further comprises a substantially cylindrical cavity and the second plate further comprises a substantially cylindrical neck extending from the angled contact surface, such that when the first and second plates are drawn together the cavity of the first plate receives the neck of the second plate.

10. The clean-out plug according to claim 1, wherein the ring-shaped sealing member is constructed of an elastomeric material.

11. A clean-out plug for use with a pipe system clean-out, the clean-out defining a clean-out end and having an inner surface, a portion of which is threaded, said clean-out plug comprising:

a first plate configured to allow a portion of a retaining member to pass therethrough and comprising:

a flange, the flange defining an outer end surface and a radially disposed inner contact surface, the inner contact surface configured to abut the clean-out end; and a core extending from the flange and configured to fit inside the clean-out, the core further defining a radially disposed retaining recess;

a compressible ring-shaped sealing member configured to be retained by the retaining recess and defining a peripheral sealing surface and an angled contact surface extending inward from the peripheral sealing surface; and a second plate, opposing the first plate and defining an end surface and a radially disposed angled contact surface extending inward from the end surface, the second plate configured to receive a portion of the retaining member such that when the retaining member engages the second plate, the first and second plates are drawn together, and wherein the angled contact surfaces of the second plate and the sealing member are configured such that upon drawing the first and second plates together, the sealing member is compressed between the first plate and the second plate and extends outwardly to seal against the inner surface of the clean-out behind the threaded portion, and further comprising a second retaining member and a cover plate configured to allow a portion of the second retaining member to pass therethrough, wherein the first retaining member is configured to receive a portion of the second retaining member such that when the second retaining member engages the first retaining member, the cover plate covers the first plate.

12. The clean-out plug according to claim 11, wherein the first retaining member receives the second retaining member in a threaded bore disposed approximately in the center of the first retaining member.

* * * * *

UNITED STATES PATENT AND TRADEMARK OFFICE
CERTIFICATE OF CORRECTION

| | | |
|---|---|---|
| PATENT NO. | : 7,464,727 B1 | Page 1 of 1 |
| APPLICATION NO. | : 11/876256 | |
| DATED | : December 16, 2008 | |
| INVENTOR(S) | : Larson et al. | |

It is certified that error appears in the above-identified patent and that said Letters Patent is hereby corrected as shown below:

Column 7,

Line 23, after "behind" cancel "is".

Signed and Sealed this

Twenty-fourth Day of March, 2009

JOHN DOLL
*Acting Director of the United States Patent and Trademark Office*